United States Patent
Pullo (10) Patent No.: US 7,890,630 B2
(45) Date of Patent: Feb. 15, 2011

(54) SYSTEMS, METHODS AND COMPUTER PROGRAM PRODUCTS FOR SUPPORTING TRANSFORMATION TO A SHARED ON-DEMAND INFRASTRUCTURE

(75) Inventor: Raffaele Pullo, Ripi (IT)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 11/953,330

(22) Filed: Dec. 10, 2007

(65) Prior Publication Data

US 2009/0150895 A1    Jun. 11, 2009

(51) Int. Cl.
*G06F 15/173* (2006.01)
*G06F 12/00* (2006.01)
*G06F 9/46* (2006.01)
*G06F 15/16* (2006.01)
*G06F 15/177* (2006.01)

(52) U.S. Cl. .................. 709/226; 709/219; 709/221; 711/147; 718/104; 718/107

(58) Field of Classification Search .............. 709/203, 709/217, 219, 221, 223, 226; 711/147; 718/104, 718/107
See application file for complete search history.

(56) References Cited

U.S. PATENT DOCUMENTS

| 5,818,906 A | * | 10/1998 | Grau et al. | ............... 379/32.04 |
| 6,859,926 B1 | * | 2/2005 | Brenner et al. | .............. 718/100 |
| 2008/0049650 A1 | * | 2/2008 | Coppage et al. | ............ 370/310 |
| 2008/0052206 A1 | * | 2/2008 | Edwards et al. | ............... 705/34 |

* cited by examiner

*Primary Examiner*—Saleh Najjar
*Assistant Examiner*—Vitali Korobov
(74) *Attorney, Agent, or Firm*—Cantor Colburn LLP; Ronald Kaschak (57) ABSTRACT

Systems, methods and computer program products for supporting transformation to a shared on-demand infrastructure. Exemplary embodiments include a method including identifying a CPU resource type (or, in general, other sharable resource) to analyze, calculating a number of servers in scope, Ns, collecting current resource usage data for systems in the scope, wherein the current resource data is provided by systems and performance management tools, identifying a Period P, counting a number of peaks (Np) in the Period, excluding adjacent spikes to each of the number of peaks, calculating an average of CPU usage, Um, which is generally provided by the usage collection tools, defining an amplitude Am, defining a value for % Ks, in the range of 0.2-0.3 (value suggested) and applying transformation formulas to obtain a minimum size of a resource pool, a size of a target environment and a resource saving.

1 Claim, 6 Drawing Sheets

SYSTEMS, METHODS AND COMPUTER PROGRAM PRODUCTS FOR SUPPORTING TRANSFORMATION TO A SHARED ON-DEMAND INFRASTRUCTURE

TRADEMARKS

IBM® is a registered trademark of International Business Machines Corporation. Armonk, N.Y., U.S.A. Other names used herein may be registered trademarks, trademarks or product names of International Business Machines Corporation or other companies.

BACKGROUND OF THE INVENTION

1. Field of the Invention

This invention relates to on-demand infrastructures, and particularly to systems, methods and computer program products for supporting transformation to a shared on-demand infrastructure.

2. Description of Background

The evaluation of the convenience to transform a traditional IT infrastructure to a shared on-demand infrastructure typically requires great efforts and can discourage customers to professionals to perform the analysis to evaluate potential savings and to adopt on-demand solutions.

SUMMARY OF THE INVENTION

Exemplary embodiments include a method including identifying a CPU resource type (or, in general, other sharable resource) to analyze, calculating a number of servers in scope. Ns, collecting current resource usage data for systems in the scope, wherein the current resource data is provided by systems and performance management tools, identifying a Period P, counting a number of peaks (Np) in the Period, excluding adjacent spikes to each of the number of peaks, calculating an average of CPU usage. Um, which is generally provided by the usage collection tools, defining an amplitude Am, defining a value for % Ks, in the range of 0.2-0.3 (value suggested) and applying transformation formulas to obtain a minimum size of a resource pool, a size of a target environment and a resource saving.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides systems, methods and computer program products that support analysis and decision makers to evaluate the convenience of performing an IT transformation to a shared on-demand infrastructure. The systems, methods and computer program products can also aid in the evaluation of the convenience to spend more effort to perform a detailed analysis. When creating a new IT infrastructure, the systems, methods and computer program products provides evaluation tools to size the IT environment to minimize costs, implementing policy of resource overbooking. The overbooking provides allocation of an amount of resources smaller than the allocation theoretically required by the IT services to be supported.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the transformation of an IT infrastructure from an environment based on static resources allocation to a dynamic on demand shared resources allocation (Shared On Demand Infrastructure) is based on techniques to virtualize and orchestrate the resources. In exemplary embodiments, resources can be allocated into an on demand shared infrastructure, to an application, part statically and part in a dynamic way, based on the variable needs of the applications. The resources are provisioned from a (logical) pool, shared across multiple applications or systems. This kind of infrastructure saves IT resources and reduces the IT costs maintaining the same performance.

In exemplary embodiments, the systems, methods and computer program products described herein can support analysts and decision makers to evaluate the real convenience of doing an IT transformation to a Shared on Demand Infrastructure. In further exemplary embodiments, the systems, methods and computer program products described herein can help to evaluate (after a short analysis) if it is convenient to spend more effort to perform a further detailed analysis. In exemplary embodiments, the systems, methods and computer program products described herein can automate some operations described herein. In addition, when creating a new IT infrastructure, the systems, methods and computer program products described herein provide evaluation to size the IT environment to minimize the costs, implementing policy of resource overbooking. The overbooking provides the possibility to allocate an amount of resources smaller then the one theoretical needed by the IT services to be supported.

Moving from a traditional model, to a shared on demand model, it is necessary a way to define how the target environment could be sized, how big a shared pool should be and what resources saving could be achieved. In exemplary embodiments, the systems, methods and computer products described herein can be based on a number of mathematical formulas where the input parameters are information determinable form the initial (as-is) IT environment. In exemplary embodiments, the systems, methods and computer products described herein define the amount of resources that should be allocated in the target environment and then the amount of resources potentially saved. As such, the systems, methods and computer program products described herein size, as an overall, the target infrastructure.

In exemplary embodiments, the systems, methods and computer products described herein address an IT infrastructure presenting a resource utilization profile with a periodic behavior, that is, an infrastructure supporting business processes with a periodic behavior. Those processes require IT resources during a period of time (called Period), with a typical resource usage profile and after the Period the usage profile restart from the beginning and is repeated in a similar way. For example, the usage-to-cash business process of a Telco has such a behavior. Some operation performed periodically in a company, like an account check production in a bank, a bill production in a utility company, a specific production chain in an industrial company, may correspond to a periodic behavior. Within a Period, the IT resources are used in a variable way from any application and server, but the overall resource utilization has a periodic behavior. The assumption of a periodic behavior, is not a real limitation, in fact where a Period is not definable in the sense exposed above, it could be defined as a shorter time-frame where a complete representative behavior of the systems in the environment occurs. If the environment does not present any typical behavior associable to a time-frame, but presents a completely random behavior, then no model like this is applicable.

For illustrative purposes, the resources concept described herein can be considered as a generic resource. However, a specific IT resource like the CPU can be discussed for illustrative purposes.

Figure 1:
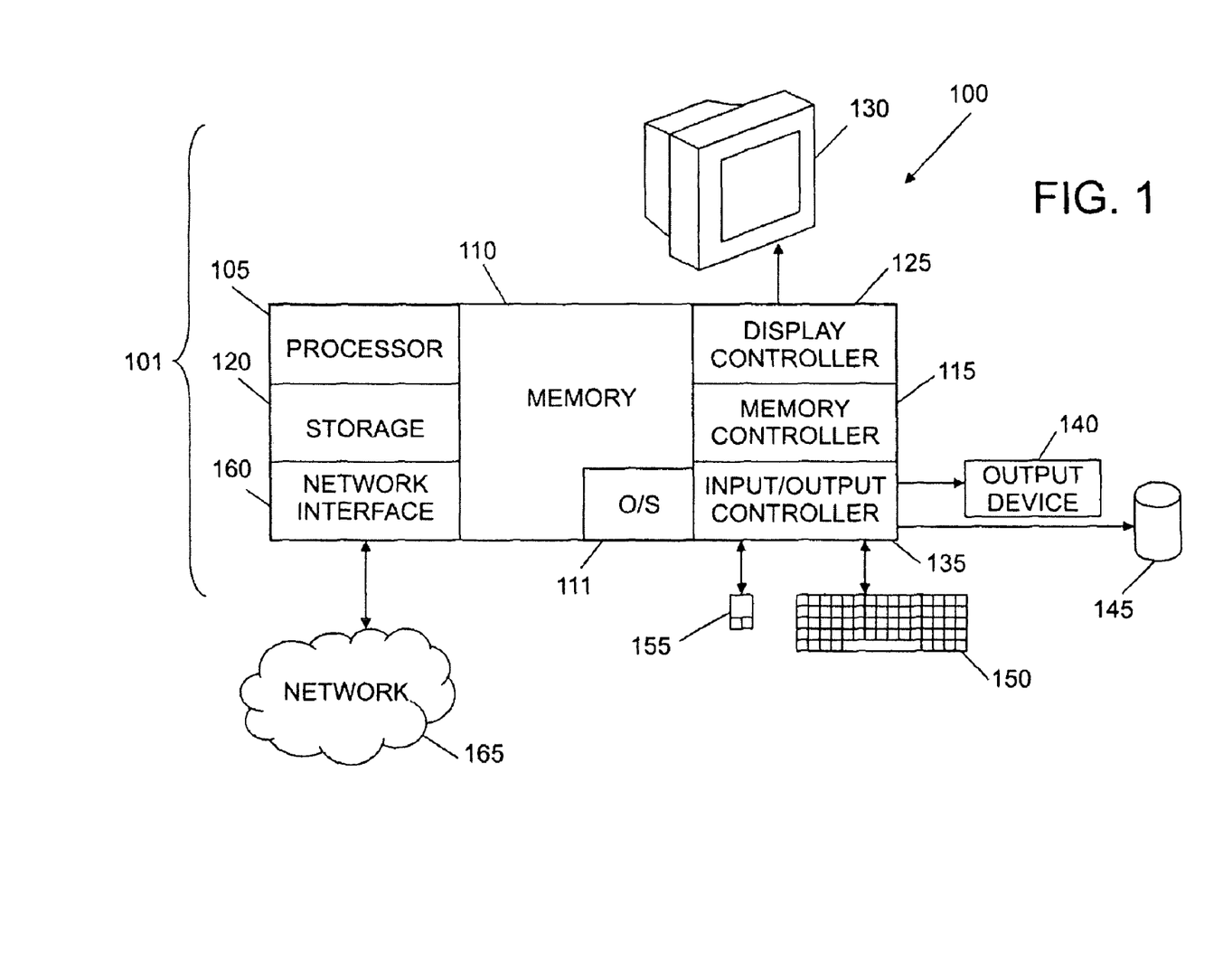
FIG. 1 illustrates a block diagram of a system for supporting transformation to a shared on-demand infrastructure in accordance with exemplary embodiments.

FIG. 1 illustrates an exemplary embodiment of a system 100 for supporting transformation to a shared on-demand infrastructure in accordance with exemplary embodiments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 10 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the transformation methods described herein in accordance with exemplary embodiments and a suitable operating system (OS) 111. The operating system 111 essentially controls the execution of other computer programs, such the transformation systems and methods described herein, and provides scheduling, input-output control, file and data management, memory management, and communication control and related services.

The transformation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the transformation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BISO) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The transformation methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The transformation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the transformation methods are implemented in hardware, the transformation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
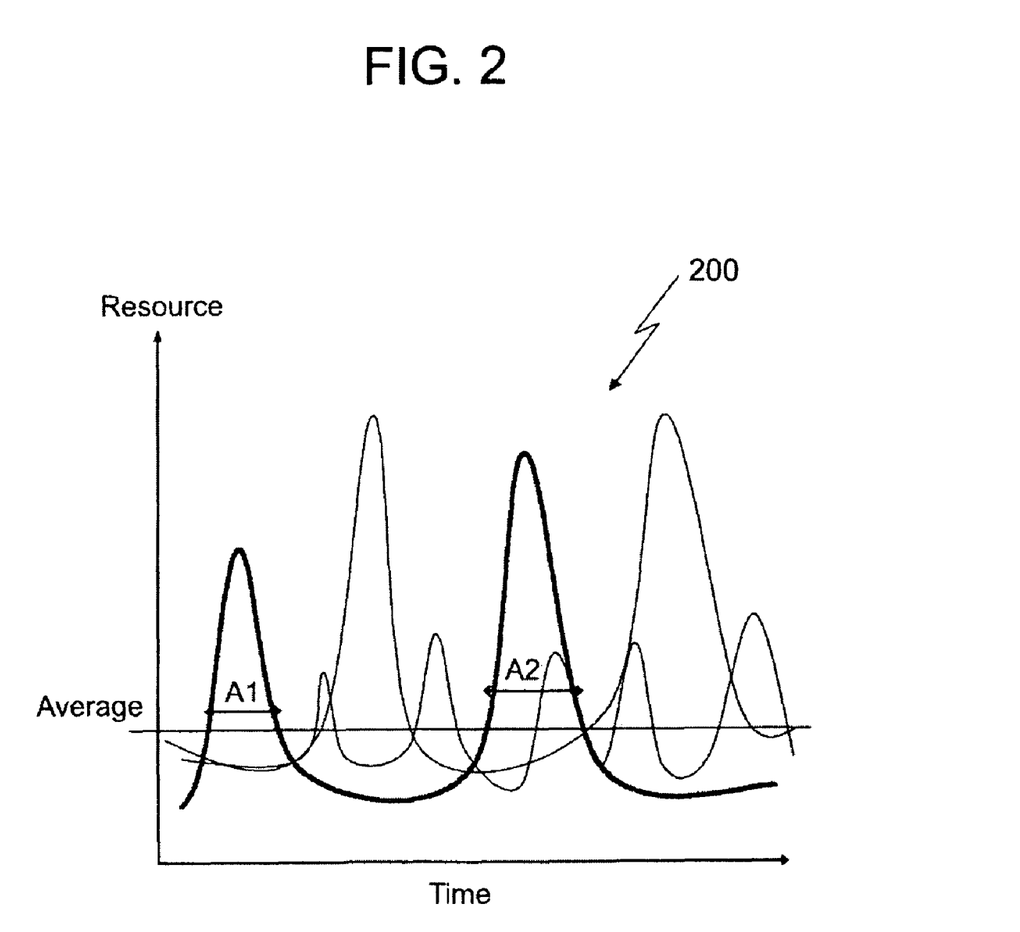
FIG. 2 represents an hypothetical resource utilization plot of servers in accordance with exemplary embodiments.

FIG. 2 represents a hypothetical resource utilization plot 200 of the servers in as described above, within a Period in accordance with exemplary embodiments. The average in FIG. 2 is the mathematical average of the resource utilization in the Period calculated for all the servers. If P is the Period and $U_i(t)$ is the analytical function describing the resource utilization during the time for a server "i", the average of the resource utilization is:

$$Um = \frac{\sum_{i=1}^{i=Ns} \frac{\int_i^P U_i(t)\,dt}{P}}{Ns},$$

where Ns is the number of servers in the environment. In exemplary embodiments, the servers can be considered as a single machine running an instance of an operating system or a virtual (or logical) partition running an operating system on a physical machine.

A1, A2 are the amplitude of the peak of the utilization functions $U_i(t)$. The amplitude can be considered as the amount of time the peak is large (i.e., in exemplary embodiments, the amplitude should be measured at the level of the average of the resource utilization, Um). As such, P and Um are the Period and the average of the resource utilization, Ns is the number of servers of the environment under consideration, Am: is the average of the amplitude of all the peaks of all the servers in a period P, and Tr is the total amount of resource in the environment. For example, if the resource considered is the CPU (and assuming all CPU with same power), Tr is the number of CPUs. If the CPUs in scope have different power, Tr is the total power measured in a measurement unit after having normalized all the CPUs power to that unit. Furthermore, % Um is the average fraction of the used resource respect to the total amount of resource (it is a number between 0 and 1). For illustrative purposes, "%" is used to mean a fraction that multiplied for 100 and provides a percentages. Then, $$\% Um = \frac{Um}{Tr}.$$

In exemplary embodiments, passing from an as-is environment with resources allocated statically (in a traditional way) to shared on demand infrastructure where resources are provisioned dynamically from a resource pool, some quantity of the target environment is calculated as fraction (or %) of the as-is environment.

In exemplary embodiments, a model is based on three formulas as now described. In exemplary embodiment, the minimum size (fraction) of the resource pool is:

$$\% MinPoolSize = \frac{Np * Am}{Ns * P} * (1 - \% Um) \quad (A)$$

For example if % MinPoolSize=0.3, it means that the shared pool of the target environment for the resource considered, should be big as 30% of the as-is environment.

In exemplary embodiments, size of the target environment (excluding the pool) as fraction of the as-is, is:

$$\% Target\_Tr = \\ = \% Um + \% Ks + \frac{Np * Am}{Ns * P} * (1 - \% Um), \quad (B)$$

where Ks is a constant representing a quantity of resource considered spare by design, it is introduced to reduce the risk of a transformation and also to take under consideration that, generally (and potentially also in the as-is environment), resources spare by design are considered during an infrastructure design. This constant should also include the resource needed to cover the resource overhead in the target environment. For example, if the resource in the target environment is the CPU and is virtualized, then there is a CPU overhead caused by the virtualization it-self. Another element to consider in the constant Ks could be a longer wait time of the processes that want to used the CPU since the target amount of the CPU is smaller compared to the as-is environment.

The resource saving reachable as fraction of the total resource of the as-is environment is:

$$\% \text{Save\_Resource} = \\ = 1 - \left[ \% Um + \% Ks + \frac{Np * Am}{Ns * P} * (1 - \% Um) \right]$$ (C)

In exemplary embodiments, the same percentage of the saving applies also the resource growth. For example, if the as-is environment growths annually of 10%, this value is reduced of a fraction given by the equation (C).

Figure 3:
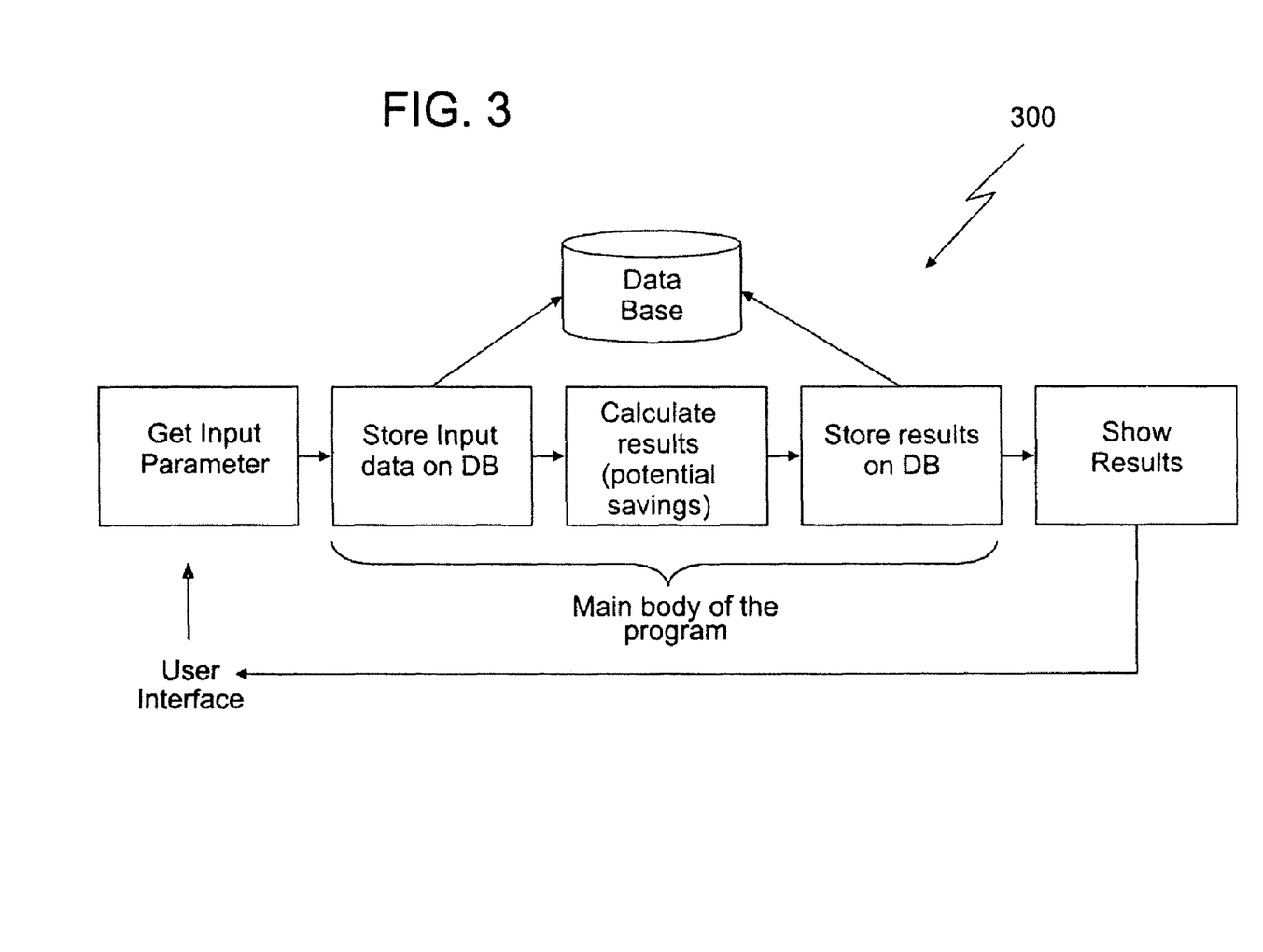
FIG. 3 illustrates a block diagram of main components of an exemplary computer program in accordance with exemplary.

FIG. 3 illustrates a block diagram of main components of an exemplary computer program 300 in accordance with exemplary embodiments and the main steps it should perform. In exemplary embodiments, by a graphical interface the program requires the user to insert input parameters coming from data collected in the IT environment: Ns, serves in scope; P, period; Np, number of peaks; % Um, CPU usage average (as decimal); Am, amplitude; and % Ks, spare resources value (as decimal). In exemplary embodiments, the % Ks parameter can be changed to perform different simulation, keeping other parameters fixed.

Figure 4:
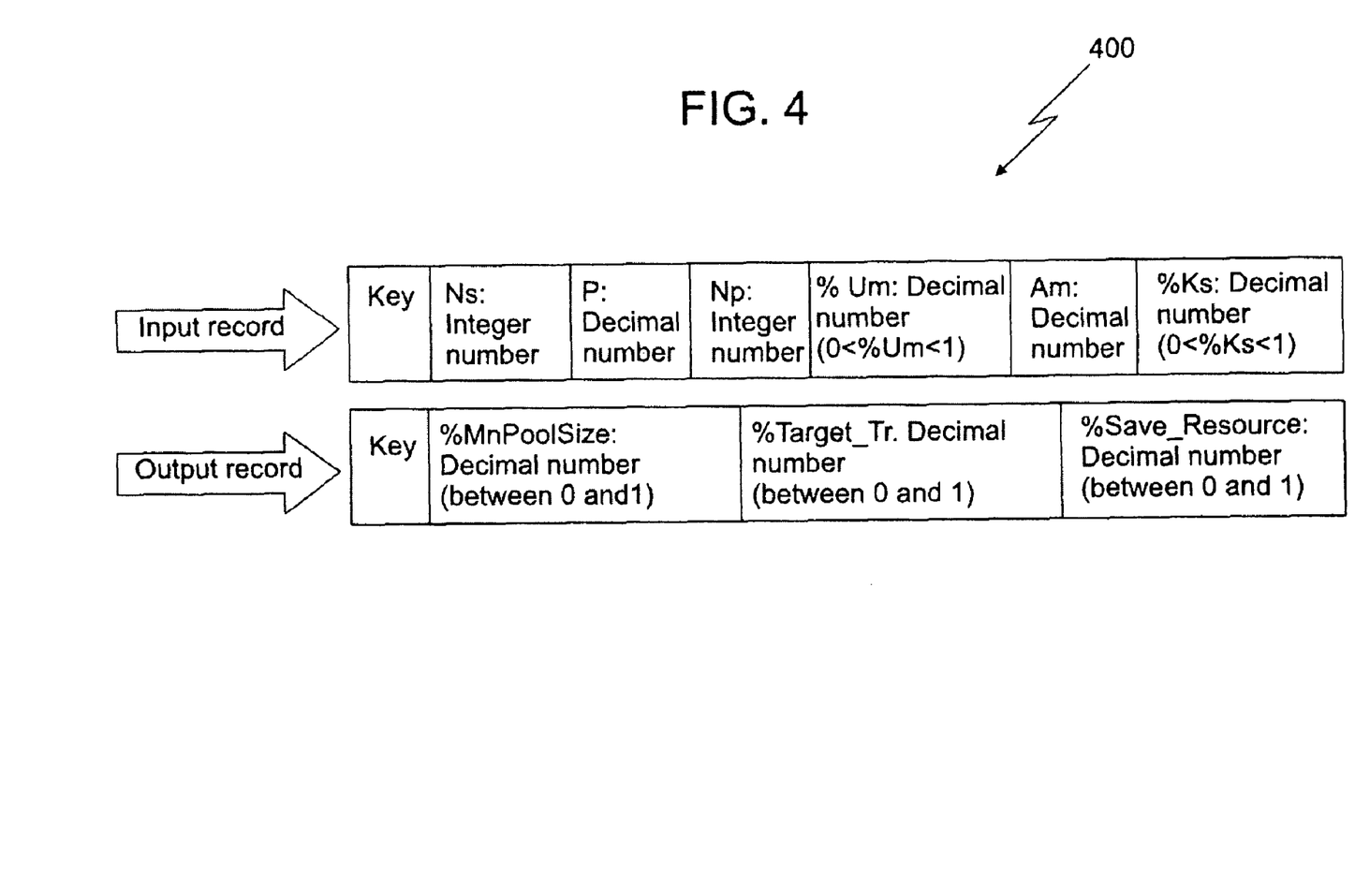
FIG. 4 illustrates a block diagram of a record format to store input and output parameters in the database in accordance with exemplary embodiments.

In exemplary embodiments, the computer program stores the input parameter in a data base (the data base records format is illustrated below) for future review and tracing. Records are stored and associated to the output data. When making several simulations, an input record associated with an output record is created per simulation. In exemplary embodiments, the computer program can calculates results using the formulas A, B, C. The output data is (corresponding to formulas applied): A, Min size of resource pool; B, Size of the resources in the target infrastructure; and C, potential resource savings. In exemplary embodiments, the computer program stores results in the database (according to the record format illustrated below). In addition, the results are reported by the computer program as output data in the user interface. FIG. 4 illustrates a block diagram of a record format to store input and output parameters in the database in accordance with exemplary embodiments. The records format in the picture shows the fields to store the input and output data. The "key" field in the records is just a key to associate input data set with output data set so that many simulations can be performed and input is associated with corresponding output.

Figure 5:
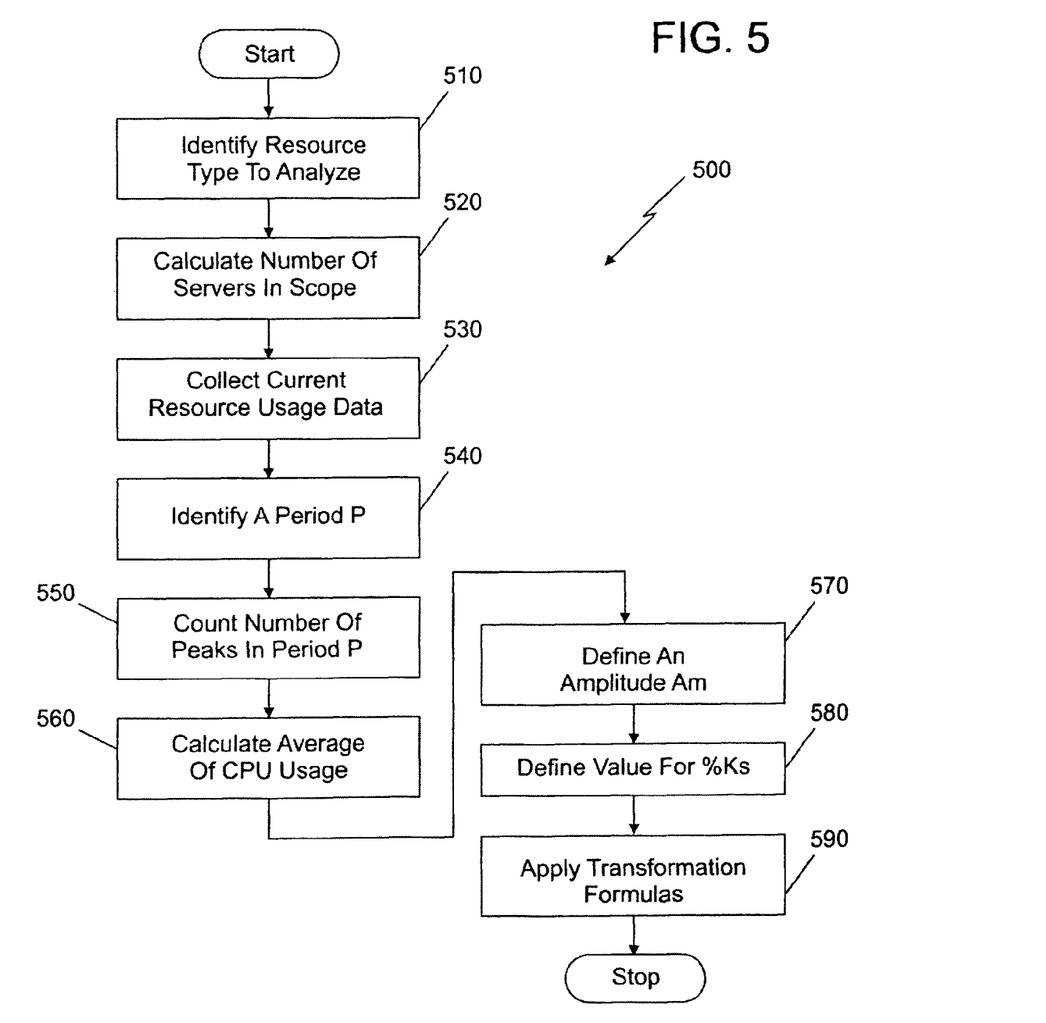
FIG. 5 illustrates a flowchart for a method for the transformation of an existing traditional infrastructure to a shared used on-demand infrastructure in accordance with exemplary embodiments.

It is appreciated that there are a variety of scenarios in which the exemplary embodiments of the systems, methods and computer products described herein can be applied. In exemplary embodiments, the systems, methods and computer products described herein can be used to implement a transformation of an existing traditional infrastructure to a shared used on demand infrastructure. FIG. 5 illustrates a flowchart for a method 500 for the transformation of an existing traditional infrastructure to a shared used on-demand infrastructure in accordance with exemplary embodiments. Following are the steps to use the model: 1) Identify the resource type to analyze (ex. CPU); at block 510 2) Calculate the number of servers in scope, Ns at block 520; 3) Collect current resource usage data for all the systems in the scope (which are generally provided by systems and performance management tools practically used by every enterprise) at block 530; 4) Identify the Period P, making some assumption if needed at block 540; 5) Count (with some assumptions if needed) the number of peaks (Np) in the Period at block 550. Be sure that spikes are not considered as peaks (e.g., several peaks very close and with a very small amplitude should be considered just as one peak); 6) Calculate the average of the CPU usage, Um (which is generally provided by the usage collection tools) at block 560; 7) Define the amplitude Am, which can be calculated or defined with an assumption based on the data provided by monitoring tools in the customer environment at block 570; 8) Define a value for % Ks, which can be affected by technical and risk related factors, at block 580 (technical factors, like overhead introduced by resource virtualization, could be estimated on the base of virtualization technology; in general the estimation could be supported by performance engineering techniques. For risk factors, consider that a bigger value of Ks reduce the risk and reduce also the estimated savings. A value of 0.2-0.3, as rule of thumb, should be more then enough. After assumed a value and estimated the savings, if these savings are interesting then investment for a more detailed study is justified); and 9 Apply the formulas (A), (B) and (C) at block 590. This step can be performed by the computer program described above.

Figure 6:
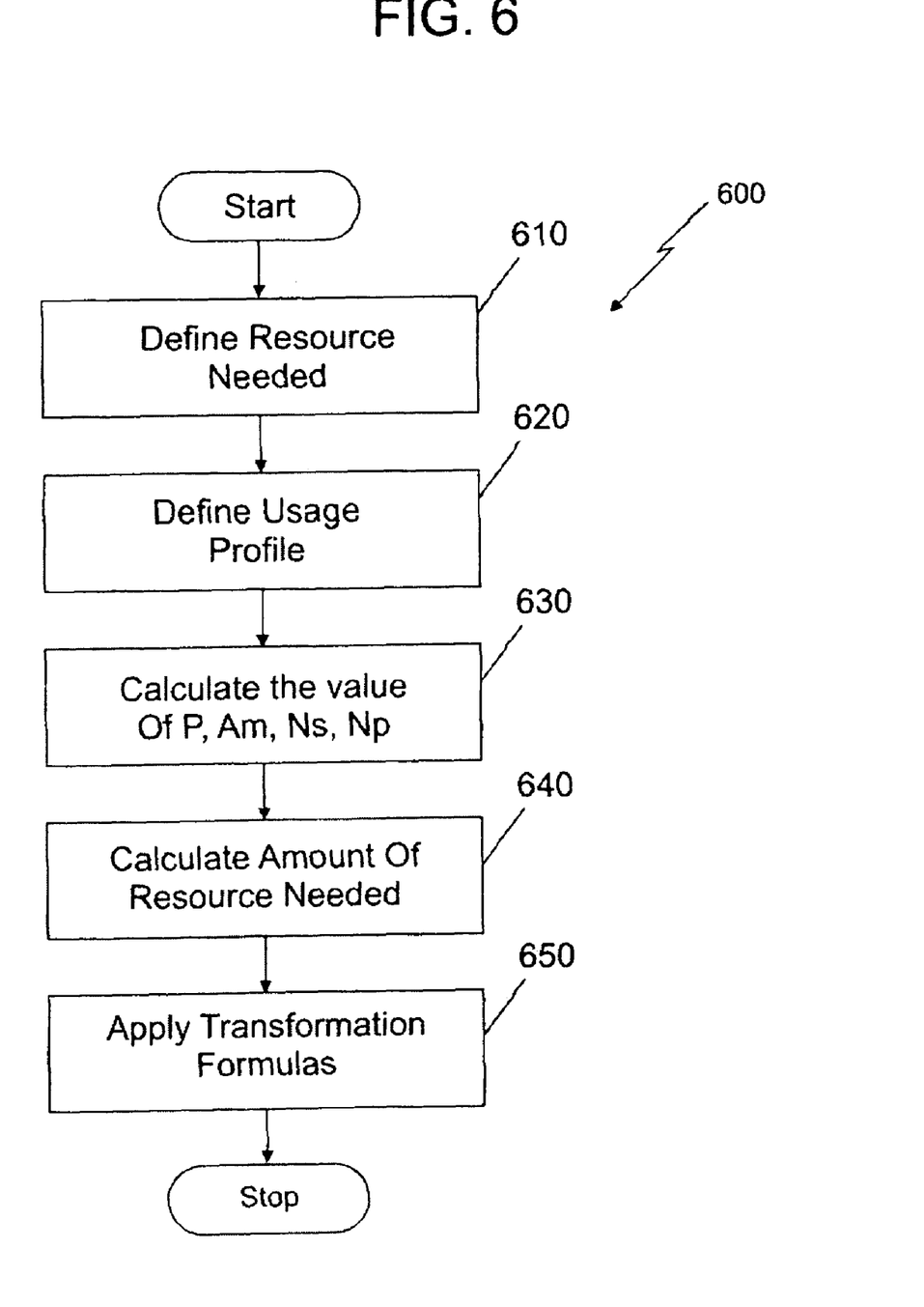
FIG. 6 illustrates a flow chart for a method for applying an overbooking model in accordance with exemplary embodiments.

In applying an overbooking model, a new It infrastructure is realized where the IT resource are allocated as shared to several applications and the size physical resources is smaller than the theoretical needed, so the resources are overbooked. An example could be a Utility Computing data center providing services to customers; the customers need a defined maximum amount of resources but the physical allocation could be smaller because the fact that not all the customers need the maximum resources at same time can be leveraged. As such, the systems, methods and computer products described herein can introduce further saving in the IT infrastructure. FIG. 6 illustrates a flow chart for a method 600 for applying an overbooking model in accordance with exemplary embodiments. Following are the steps to use the model: 1) Define the amount of resource needed, in a traditional IT infrastructure, by every application or service (customer) to be hosted in the data center at block 610; 2) Define, also making assumption, the usage profile of the resources in a similar way illustrated by the FIG. 2 at block 620; 3) Calculate the value of P, Am, Ns, Np at block 630. Of course, those values are affected by the assumptions and approximations made in defining the resource usage profile; 4) Calculate the total amount of resource, Tr, theoretical needed (as sum of resource required by every application/service) at block 640; and 5) Use the formulas (A), (B), (C), to calculate how the IT infrastructure should be sized and the saving achievable respect to allocation of all physical resources theoretically needed at block 650. The calculation of formulas results can be performed by the computer program described above.

It is therefore appreciated that transforming an IT infrastructure adopting a model where resources are partially provisioned dynamically (orchestration), potentially introduces savings. The target environment size (including the pool) and the actual potential savings can be calculated, with approximation, from some characteristic of the current environment, which supports analysts and decision makers to evaluate the real convenience of doing such a transformation, or to evaluate if it is convenient to spend more effort to do e more detailed analysis. The model presented allows at the same time to introduce a factors to minimize potential risks, by introducing a spare by design resource. Dealing with the creation of a new IT infrastructure with an on demand fashion, for example a utility computing, the systems, methods and computer program products as described herein provide the possibility to evaluate how to size the IT environment to minimize the costs, implementing policies of resource overbooking.

The following is a proof of the formulas (A), (B), (C) described above. In exemplary embodiments, Np is the total number of peaks in a period P, Ni is the number of intervals is defined as:

$$Ni = \frac{P}{Am} \quad (1)$$

In exemplary embodiments, in this way the period P is divided in a number Ni of temporal windows.

No is the number of peaks in overlapping, and defined as:

$$No = \frac{Np}{Ni} \quad (2)$$

This value represents how many times the peak of different servers are in overlapping during the period P. If two peaks are in the same interval, they are considered in overlapping, which is an approximation because the number of interval is based on an average of the peaks amplitude.

Er: efficiency rate, is defined as:

$$Er = \frac{Ns - No}{Ns} = 1 - \frac{No}{Ns} \quad (3)$$

The efficiency rate is a number between 0 and 1 (0<Er<0), and Ns>No. In exemplary embodiments, the model performs well when Ns is a big number and does not work at all if Ns<No.

When an overlapping of two peaks of two servers occurs, the resource (imagine the power (CPU) of a server is not potentially usable for the other server. If whiting and interval two peaks overlap, the resource of one server cannot be "lent" to the other in a logic of resource shared. In exemplary embodiments, the lending of a resource happens because the unused resource is logically in a shared pool and from that could be provisioned to another server. As the definition of Er shows, if the number of servers is equal to the number of overlaps (Ns=No) then the efficiency is zero (Er=0); in fact in this case all the seltzers requires the resource at same time, then there is no possibility to optimize the amount of the resource contended, for this reason, the efficiency is said to be is null.

Substituting the definition (1) and (2), the (3) becomes:

$$Er = 1 - \frac{Np * Am}{Ns * P} \quad (4)$$

If the servers consume the resource only during a peak and consume no resource in other moments (this assumption is soon removed). Residual resource can be called the amount of a unused resource in the environment in scope, it can be expressed as:

$$Rr = Tr*Er \quad (5)$$

Tr is the total amount of resource in the environment. If Er=1 then the residual resource is the total resource, in other words if there is no overlapping of the peaks the residual resource is the total amount of the resource. At least an amount of resource for one peak can be considered as not residual, and this amount could be considered negligible in the model. When no peak happens for a server, generally the sever is not consuming zero resource. Then, the residual resource in (5) is not actually non used amount of resource. The average of the used resource can be subtracted to have the actual unused and then potentially free resource (Rf):

$$Rf = (Tr - Um)Er = Tr * \left(1 - \frac{Um}{Tr}\right) * Er = \\ = Tr * (1 - \%Um) * Er \quad (6)$$

Substituting the (4) in the (6) the following is obtained:

$$Rf = Tr * \left(1 - \frac{Np * Am}{Ns * P}\right) * (1 - \%Um) \quad (7)$$

If the total amount of resource (Tr) is divided, then:

$$\%Rf = \left(1 - \frac{Np * Am}{Ns * P}\right) * (1 - \%Um) \quad (8)$$

where % Rf is the fraction, of the total resource in the environment in scope (as is environment), potentially not used; this quantity depends on base information: average of the resource used, number of servers, and information from the profile of the resource utilization (number of peaks, amplitude of the peaks, period).

Now, a target (to be) designed environment in a fixed/shared logic, the target environment should have an amount of resource equal to:

Target_Tr=Fixed_Resource+Spare_Resource+Resource_in_Pool (9)

The resource to be allocated in a fixed way (Fixed_Resource) is the average of used from the as is environment, Um. An amount of resource to be spared by design can also be introduced. As described herein, this is a resource to be introduced in order to reduce the risk and have a more resilient target environment. As described herein, the spare by design resource of the as-is environment (if existing) is included, in the amount of the resource considered free, then, the same amount in the target (to be) environment is considered. The Spare_Resource in (9) is a constant quantity defined by design. Ks and % Ks are called the spare fraction. This constant includes also other quantity as described herein.

The size of the shared pool is then calculated. The amount of resource actually used is Tr-Rf, and could be considered as a part allocated statically (Um) and a variable part as something that in the target environment could be provisioned from the shared pool. As such:

Tr-Rf=Um+MinPoolSize where MinPoolSize is the minimum size a pool should have in the target environment provisioned in a dynamic way. It is:

MinPoolSize=Tr-Um-Rf (10)

then, dividing for Tr the percentage (as a fraction) of the minimum pool size respect to the total resource of the as-is environment is obtained:

% MinPoolSize=1-(%Um+%Rf) (11)

Substituting the (8) in the (11) the equation (A) is obtained:

$$\% MinPoolSize = \frac{Np*Am}{Ns*P} *(1-\% Um) \quad (12)$$

Therefore, designing a target environment in a shared on demand logic minimum size the pool should have in terms of fraction of the as-is environment is known.

Substituting in the (9), and dividing for Tr, the size of the resource in the target environment as fraction of the as-is environment is obtained:

$$\% Target\_Tr = \\ = \% Um + \% Ks + \frac{Np*Am}{Ns*P}*(1-\% Um) \quad (13)$$

The above equation is the equation (B).

The saving reachable when passing from an as-is environment to a target environment with resource provisioning from a pool (i.e., with a mechanism to provision dynamically the resource) is then calculated. It is:

Save_Resource=$Tr$−Target_$Tr$

Dividing for Tr to obtain the saving in terms of percentage (fraction) respect to the as-is environment, the following is obtained:

% Save_Resource=1−% Target_$Tr$    (14)

Then substituting (13) in (14):

$$\% Save\_Resource = \\ = 1 - \left[ \% Um + \% Ks + \frac{Np*Am}{Ns*P}*(1-\% Um) \right] \quad (15)$$

that is the equation (C) and gives the possibility to calculate a potential saving in terms of quantity specific of the as-is environment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system, a method for transformation to a shared on demand infrastructure, the method comprising:
    identifying a sharable resource including at least one of a CPU resource type to analyze;
    calculating a number of servers in scope, Ns;
    collecting current resource usage data for systems in the scope, wherein the current resource data is provided by systems and performance management tools;
    identifying a Period P;
    counting a number of peaks, Np, in the Period, excluding adjacent spikes to each of the number of peaks;
    calculating an average of CPU usage, % Um, which is generally provided by the usage collection tools;
    defining an amplitude Am;
    defining a spare resources value for % Ks, in the range of 0.2-0.3; and
    applying transformation formulas to obtain a minimum size of a resource pool, a size of a target environment and a resource saving,
    wherein a transformation formula to calculate the minimum size of the resource pool, % MinPoolSize, is:

$$\% MinPoolSize = \frac{Np*Am}{Ns*P}*(1-\% Um),$$

wherein a transformation formula to calculate the size of the target environment, % Target Tr, is:

$$\% Target\_Tr = \\ = \% Um + \% Ks + \frac{Np*Am}{Ns*P}*(1-\% Um),$$

wherein a transformation formula to calculate the resource saving, % Save Resource, is:

$$\% Save\_Resource = \\ = 1 - \left[ \% Um + \% Ks + \frac{Np*Am}{Ns*P}*(1-\% Um) \right].$$

* * * * *